(12) United States Patent
Raki et al.

(10) Patent No.: US 10,611,670 B2
(45) Date of Patent: Apr. 7, 2020

(54) SEALING ARRANGEMENT OF A DRAWING FURNACE

(71) Applicant: ROSENDAHL NEXTROM GMBH, Pischelsdorf (AT)

(72) Inventors: Olli Raki, Helsinki (FI); Joonas Ilmarinen, Helsinki (FI); Urmas Jöksi, Helsinki (FI); Risto Widerholm, Espoo (FI); Esa Huttunen, Helsinki (FI)

(73) Assignee: ROSENDAHL NEXTROM GMBH, Pischelsdorf (AT)

( * ) Notice: Subject to any disclaimer, the term of this patent is extended or adjusted under 35 U.S.C. 154(b) by 241 days.

(21) Appl. No.: 15/702,222

(22) Filed: Sep. 12, 2017

(65) Prior Publication Data

US 2018/0072609 A1 Mar. 15, 2018

(30) Foreign Application Priority Data

Sep. 14, 2016 (FI) .................................. 20165686

(51) Int. Cl.
  *C03B 37/02* (2006.01)
  *C03B 37/029* (2006.01)
  (Continued)

(52) U.S. Cl.
  CPC ...... *C03B 37/029* (2013.01); *C03B 37/02736* (2013.01); *C03B 37/08* (2013.01); *C03B 2205/80* (2013.01)

(58) Field of Classification Search
  CPC .................................................. C03B 37/029
  See application file for complete search history.

(56) References Cited

U.S. PATENT DOCUMENTS 6,543,257 B1 4/2003 Koaizawa et al.
6,945,079 B2 9/2005 Oh et al.
(Continued)

FOREIGN PATENT DOCUMENTS

CN 103304135 B 1/2015
CN 102649622 B 3/2016
(Continued)

OTHER PUBLICATIONS

Nov. 13, 2018 Office Action issued in Japanese Patent Application No. 2017-171900.
(Continued)

*Primary Examiner* — Jodi C Franklin
(74) *Attorney, Agent, or Firm* — Oliff PLC

(57) ABSTRACT

A sealing arrangement for a drawing furnace including a vertical center hole with surrounding heating elements for receiving a glass preform including a tapered portion connected to an extension rod. A sealing with an opening is arranged on top of the furnace. The arrangement includes an outer annular bushing arranged on top of the furnace and an inner annular bushing with a first and an opposing second vertical end. The inner bushing is positionable to surround at least part of the tapered portion with the first end positioned to the region of the beginning of the tapered portion and the second end includes protrusions on the outer surface. As the inner bushing is inserted in the outer bushing it is arranged to be movable within the outer bushing and the protrusions form supports for holding the second end of the inner bushing above the center hole.

10 Claims, 2 Drawing Sheets

(51) Int. Cl.
*C03B 37/08* (2006.01)
*C03B 37/027* (2006.01)

(56) References Cited

U.S. PATENT DOCUMENTS

2011/0265522 A1  11/2011 Okada
2016/0002090 A1* 1/2016 Okazaki ............ C03B 37/02736
                                                         65/435

FOREIGN PATENT DOCUMENTS

| | | |
|---|---:|---|
| EP | 2664593 B1 | 1/2016 |
| JP | H03-037128 A | 2/1991 |
| JP | 2000-264670 A | 9/2000 |
| JP | 2002-356344 A | 12/2002 |
| JP | 2003-171139 A | 6/2003 |
| JP | 2004-161563 A | 6/2004 |
| JP | 2011-230978 A | 11/2011 |
| JP | 2015-74600 A | 4/2015 |
| KR | 10-2011-0121556 A | 11/2011 |

OTHER PUBLICATIONS

Jan. 29, 2018 Extended European Search Report issued in European Patent Application No. 17190876.7.
Dec. 18, 2018 Office Action issued in Korean Patent Application No. 10-2017-0116541.
Apr. 5, 2017 Search Report issued in Finnish Patent Applicaton No. 20165686.
Dec. 25, 2019 Pre-Grant Opposition filed in Indian Patent Application No. IN201744032017.

* cited by examiner

SEALING ARRANGEMENT OF A DRAWING FURNACE

FIELD OF THE INVENTION

The invention relates to a sealing arrangement of a drawing furnace.

BACKGROUND OF THE INVENTION

Previously a furnace is known for heating a glass preform such that the glass preform may be drawn into an optical fiber. This known furnace comprises a vertical furnace core tube with a surrounding heater. The glass preform is fed into this furnace from above, and while the glass preform is heated, an optical fiber may be drawn from a softened lower end of the glass preform.

The furnace may use induction heating technique to heat up a graphite heating element, for instance, or be a resistance furnace. As graphite reacts with oxygen and with products of the dissociation of the quartz glass in high temperatures an inert gas flow is required for preventing the oxidation. The inert gas or the like, such as argon, helium or nitrogen, is supplied into the core tube.

The glass preform has an elongated round body part and a taper part on its upper end. To the upper end is connected a support rod and the support rod hangs with the glass preform. As the glass preform is fed to the furnace the changes of the glass preform diameter require a sealing arrangement to prevent the inert gases from leaking out of the drawing furnace. It is known to arrange a sleeve member to surround the outer periphery of the support rod which then closes the opening of the furnace sealing as the taper part of the glass preform passes through.

The drawback with the previous solution is a risk that the metal sleeve member surrounding the support rod enters the drawing furnace and forms a joint with the glass preform. Further, as the taper part passes through the sealing the shape of the formed flow channel for the inert gases flowing upwards out of the furnace causes turbulence to the inert gas flow and it disturbs the heating process of the preform within the drawing furnace.

BRIEF DESCRIPTION OF THE INVENTION

An object of the present invention is to solve the above mentioned drawbacks and to provide a simple and efficient solution for preventing parts of a sealing arrangement entering to a drawing furnace and forming a joint with the glass preform and for reducing an inert gas flow leakage from the drawing furnace during a glass preform feeding.

This object is achieved with a sealing arrangement of a drawing furnace according to independent claim 1.

A sealing arrangement of a drawing furnace comprises a furnace comprising a vertical centre hole with surrounding heating elements for receiving a glass preform comprising a tapered portion connected to an extension rod, and a sealing with an opening arranged on the top of the furnace for sealing off the interior of the furnace from the surrounding environment. The arrangement comprises an outer annular bushing arranged on the top of the drawing furnace and an inner annular bushing with a first and an opposing second vertical end, and the inner annular bushing is positionable to surround at least part of the tapered portion with the first end positioned to the region of the beginning of the tapered portion and the second end comprises protrusions on the outer surface. As the inner bushing is inserted in the outer bushing the inner bushing and the protrusions are arranged to be movable within the outer bushing and the protrusions form supports for holding the second end of the inner bushing above the vertical centre hole.

An advantage of the invention is that the risk of the inner bushing surrounding the extension rod enters to the drawing furnace and forms a joint with the glass preform is eliminated. Further, as the taper part passes through the sealing the shape of the formed flow channel for the inert gases flowing upwards out of the furnace remains substantially the same and causes no turbulence to the inert gas flow and the heating process of the preform within the drawing furnace is not disturbed.

The preferred embodiments of the Invention are disclosed in the dependent claims.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
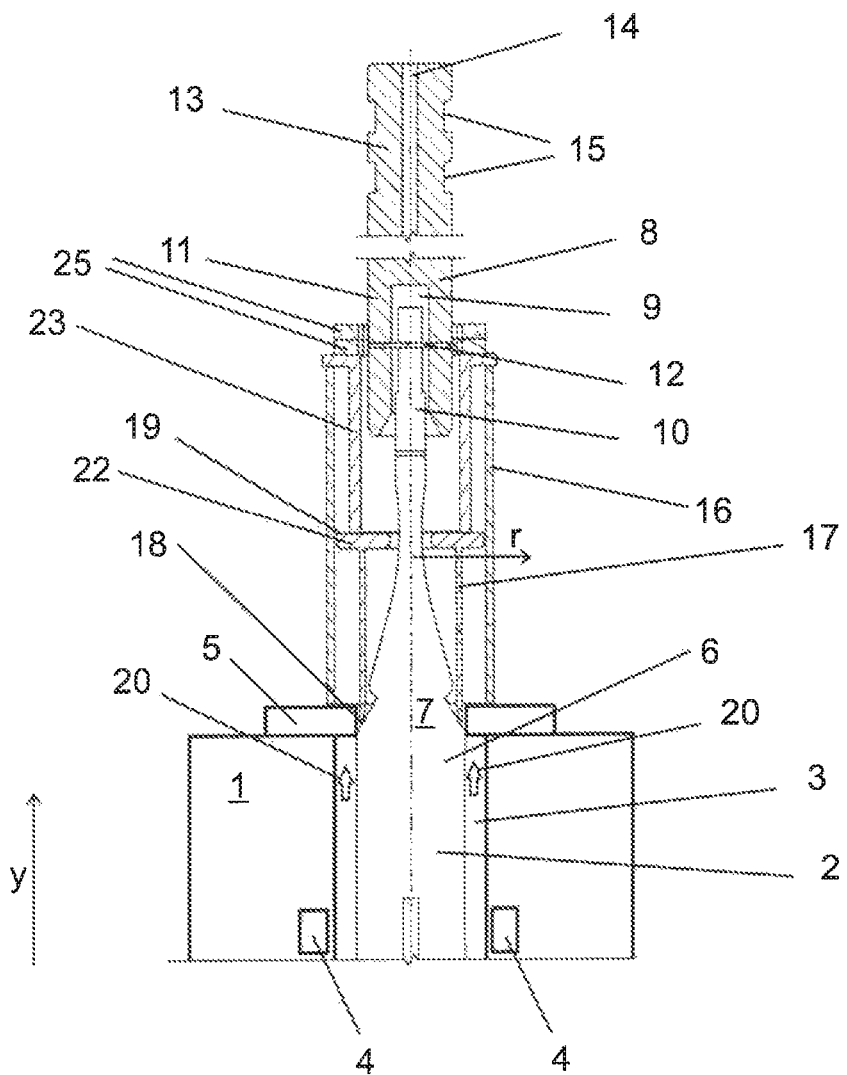
FIG. 1 shows a sealing arrangement of a drawing furnace during a preform drawing.

FIG. 1 shows a sealing arrangement of a drawing furnace during a preform drawing. The drawing furnace 1 heats a glass preform 2 such that the glass preform 2 may be drawn into an optical fiber. The glass preform 2 is inserted into a vertical centre hole 3 of the drawing furnace 1 from above. The optical fiber is manufactured by drawing a optical fiber while the glass preform 2 is heated and melted and by drawing out the fiber through the outlet at the lower section of the centre hole 3. Only the upper section of the drawing furnace 1 is shown in the Figures.

The centre hole 3 is surrounded by one or more heating elements 4, e.g. a graphite heating element, for heating and melting the glass preform. An inert gas such as argon, helium or nitrogen, is supplied into the centre hole 3 for preventing oxidation in the drawing furnace 1.

A sealing 5 with an opening is arranged on the top of the drawing furnace 1 for sealing off the interior of the furnace from the surrounding environment The sealing 5 may be an O-ring seal, for instance. The interior diameter of the O-ring is dimensioned to generally correspond to the outer diameter of the glass preform 2, while the outer part of the ring is arranged tightly along the surface of the drawing furnace 1.

Further, the sealing 5 with an opening arranged on the top of the drawing furnace may be with a plurality of sealing elements as disclosed in EP2664593B1, where sealing elements are arranged generally in a ring configuration around a centre opening. Each sealing element comprises a sealing surface facing the centre opening. At least one chamber for receiving sections of the sealing elements is provided and an inlet to a fluid source for providing the at least one chamber with fluid in order to generate an overpressure acting on the sections of the sealing elements received in the at least one chamber, and for pressing and moving the sealing surfaces of the sealing elements towards the centre opening. The sealing with plurality of sealing elements is controlled not to operate when the inner bushing arrives into the sealing with plurality of sealing elements for protecting its sensitive parts.

The glass preform 2 has an elongated round body part 6 and a tapered portion 7 on its in vertical direction y upper end. The tapered portion 7 is connected to an extension rod 8. The extension rod 8 comprises an elongated round body comprising a cylindrical hole 9 for receiving a handle part 10 of the glass preform 2 at its first end 11. The handle part 10 of the glass preform 2 is attached to the extension rod 8 with attaching means, e.g. by means of a pin 12. The second end 13 comprises a vertical bore 14 with one or more grooves 15 formed on the outer surface of the second end 13. The second end 13 may also comprise a solid part with at least one groove 15 formed on the outer surface of the solid part. The glass preform 2 is suspended from the second end of the extension rod 13 and moved downward as the glass fiber drawing proceeds.

The arrangement comprises an outer annular bushing 16. The outer annular bushing 16 comprises a cylinder shaped part. In the Figures the outer bushing 16 is fixed to the sealing 5 positioned on the top of the drawing furnace 1. The outer bushing 16 may also be fixed to the drawing furnace 1. It is also possible to attach the outer bushing 16 to the glass preform 2 and the outer bushing 16 then moves downward towards the drawing furnace 1 together with the glass preform 2. The outer bushing 16 comprises preferably quartz glass.

The arrangement comprises an inner annular bushing 17 with a first 18 and an opposing second vertical end 19. The inner 17 and outer bushings 16 are arranged coaxially. The inner annular bushing 17 is arranged to surround at least part of the tapered portion 7. The inner bushing 17 is not fastened to the glass preform 2 but the inner bushing 17 rests on the surface of the tapered portion 7. The first end of the inner annular bushing 18 is positioned to the region of the beginning of the tapered portion 7 of the glass preform 2. The curvature of the surface of the glass preform 2 is discontinuous at the point where the tapered portion 7 begins causing perturbations to the inert gas 20 flowing along the glass preform 2 surface in the vertical centre hole 3. As the inner annular bushing 17 comprises a substantially constant outer diameter it provides a continuous surface for the inert gas flow 20. The outer diameter of the inner bushing 17 is preferably slightly smaller than the outer diameter of the preform.

The inner edge 21 of the first end of the inner bushing 18 may be chamfered for creating a tapered surface. The chamfer angle is preferably 5-15°. The chamfered edge provides less inert gas leakage 20a between the inner surface of the first end of the inner bushing 18 and the outer surface of the glass preform 2 as the shapes of the surfaces are more alike.

The second end of the inner bushing 19 is positioned in the vertical direction y upper than the first end 18 and it is closer to the handle part 10 than the first end. The second end of the inner bushing 19 comprises protrusions 22 on the outer surface.

Above the inner bushing 17 in the vertical direction y of the arrangement is provided an intermediate bushing 23 coaxially with the inner bushing 17. The intermediate bushing 23 is not fastened to the glass preform 2 but the intermediate bushing 23 rests on the inner bushing 17. The extension rod 8 and the glass preform 2 prevent the intermediate bushing 23 from falling sideways. The intermediate bushing 23 comprises cylinder shaped part with protrusions, e.g. a flange 24, on its in the vertical direction y upper end. On top of the intermediate bushing is placed one or more sealing members 25 and the sealing members 25 are ring sealings, for instance. The sealing members 25 decrease the clearance between the inner surface of the intermediate bushing 23 and the outer surface of the extension rod 8.

The cylinder shaped part of the intermediate bushing 23 is dimensioned to fit within the outer bushing 16 and to be movable within the outer bushing 16. The protrusions, e.g. flange 24, are dimensioned to exceed the inner diameter of the outer bushing 16 to prevent the intermediate bushing 23 from sliding through the outer bushing 16.

When the glass preform 2 drawing has been going on and the glass preform 2 approaches its final position the inner bushing 17 reaches the level of the outer bushing 16. The inner bushing 17 and its protrusions 22 are dimensioned to fit within the outer bushing 16 and to be movable within the outer bushing.

In the FIG. 1 shown drawing phase the first end of the inner bushing 18 is arriving into the opening of the sealing 5 arranged on the top of the drawing furnace 1. The intermediate bushing 23 with the supporting protrusions 22 is placed on top of the outer bushing 16 by means of the protrusions 22. The intermediate bushing 23 together with the sealing members 25 seals the vertically y upper opening of the outer bushing 16. As the vertically y upper opening of the outer bushing 16 is closed the inert gas 20 passing through the clearance between the glass preform 2 and the centre hole 3 or the inert gas 20a passing through the clearance between the glass preform 2 and the inner bushing 17 cannot escape to the atmosphere but remains within the outer bushing 16.

Figure 2:
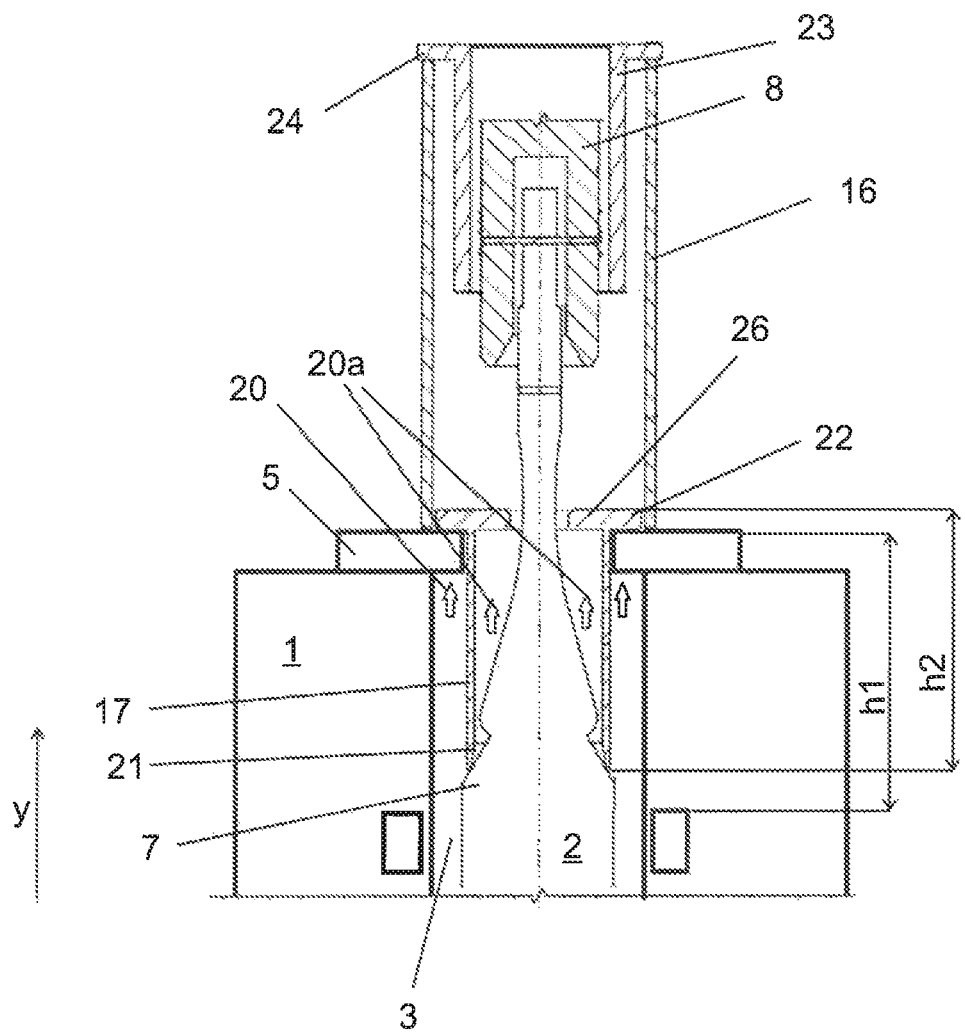
FIG. 2 shows a sealing arrangement of a drawing furnace during an end phase of the preform drawing.

FIG. 2 shows a sealing arrangement of a drawing during an end phase of the preform drawing. The second end of the extension rod 13 and the sealing members 25 are not shown in the FIG. 2 for the sake of clarity.

The protrusions 22 form supports for holding the second end of the inner bushing 19 above the centre hole 3. The sealing 5 which seals the centre hole 3 from above forms a supporting surface for the inner bushing 17. It is also possible to configure the outer bushing 16 to comprise a supporting surface for protrusions 22 of the inner bushing 17. In the Figures the protrusions 22 are a flange surrounding the outer surface of the second end 19 protruding into a radial direction r of the inner bushing 17. The protrusions 22 contacting the supporting surface prevent the inner bushing 17 surrounding the extension rod 8 from entering the drawing furnace 2.

The distance h1 between the supporting surface which supports the inner bushing 17 and the heating element 4 is longer than the height h2 of the inner bushing 17. As the inner bushing 17 does not extend in the vertical centre hole 3 to the region of the heating element 4 the formation of a joint with the glass preform 2 is eliminated.

The inner bushing 17 may comprise a reducing fitting 26 protruding inwards in the radial direction r at its second end 19. The inward reducing fitting 26 reduces the amount of the uncovered cross sectional surface causing flow resistance to the inert gas 20a passing through the clearance between the glass preform 2 and the first end of the inner bushing 18. The reducing fitting 26 also helps to center the inner bushing.

As the tapered portion 7 covered by the substantially cylindrical shaped inner bushing 17 passes through the sealing 5 the shape of the formed flow channel for the inert gases 20 flowing upwards out of the furnace 1 remains substantially annular. It reduces the turbulence of the inert gas flow 20 and the heating process of the glass preform 2 within the drawing furnace 1 is not disturbed.

It will be obvious to a person skilled in the art that, as the technology advances, the inventive concept can be implemented in various ways. The invention and its embodiments are not limited to the examples described above but may vary within the scope of the claims.

Part list: 1 a drawing furnace, 2 a glass preform, 3 a hole, 4 a heating element, 5 a sealing, 6 a body part, 7 a tapered portion, 8 an extension rod, 9 a cylindrical hole, 10 a handle part, 11 a first end of the extension rod, 12 a pin, 13 a second end of the extension rod, 14 a bore, 15 a groove, 16 an outer bushing, 17 an inner bushing, 18 a first end of the inner bushing, 19 a second end of the inner bushing, 20, 20a an inert gas flow, 21 an inner edge, 22 protrusions, 23 an intermediate bushing, 24 a flange, 25 a sealing member, 26 a reducing fitting.

h1 a distance, h2 a height of the inner bushing, r a radial direction, y a vertical direction.

The invention claimed is:

1. A sealing arrangement of a drawing furnace, the sealing arrangement comprising:
   the drawing furnace including a vertical centre hole radially surrounded by a plurality of heating elements and configured to receive a glass preform having a tapered portion connected to an extension rod;
   a sealing having an opening and disposed on a top of the drawing furnace so as to seal an interior of the drawing furnace from a surrounding environment;
   an outer annular bushing disposed on the top of the drawing furnace;
   an inner annular bushing including a first end and a vertically opposing second end, the first end of the inner annular bushing being configured to radially surround at least part of the tapered portion of the glass preform and the second end of the inner annular bushing including a plurality of protrusions on an outer surface of the inner annular bushing, the plurality of protrusions extending radially outward from the inner annular bushing towards the outer annular bushing and within the outer annular bushing so as to slide within the outer annular bushing, and the plurality of protrusions form supports that are configured to hold the second end of the inner annular bushing above the vertical centre hole upon the plurality of protrusions sliding towards the drawing furnace; and
   an intermediate bushing disposed coaxially and vertically above the inner annular bushing, the intermediate bushing including a flange having a diameter greater than a diameter of the outer annular bushing, the intermediate bushing being disposed on a top surface of the outer annular bushing and in contact with the outer annular bushing via the flange such that an upper opening of the outer annular bushing is sealed.

2. The sealing arrangement of a drawing furnace according to claim 1, wherein the plurality of protrusions form a second flange radially surrounding the second end of the inner annular bushing.

3. The sealing arrangement of a drawing furnace according to claim 1, wherein the outer annular bushing is attached to the sealing.

4. The sealing arrangement of a drawing furnace according to claim 1, wherein the outer annular bushing is configured to be attached to the glass preform.

5. The sealing arrangement of a drawing furnace according to claim 1, wherein an inner edge of the first end of the inner annular bushing is chamfered and has a chamfer angle from 5° to 15°.

6. The sealing arrangement of a drawing furnace according to claim 1, wherein the sealing includes a supporting surface for the plurality of protrusions.

7. The sealing arrangement of a drawing furnace according to claim 1, wherein the outer annular bushing includes a supporting surface for the plurality of protrusions.

8. The sealing arrangement of a drawing furnace according to claim 1, wherein a distance between a supporting surface of the outer annular bushing and a heating element of the plurality of heating elements is longer than a height of the inner annular bushing.

9. The sealing arrangement of a drawing furnace according to claim 1, wherein the extension rod has an elongated round body and includes a cylindrical hole for receiving a handle part of the glass preform at a first end of the glass preform.

10. The sealing arrangement of a drawing furnace according to claim 9, wherein the extension rod includes, at a second end, a solid part with at least one groove formed on an outer surface of the solid part.

* * * * *